(12) United States Patent
Stone

(10) Patent No.: X8867
(45) Date of Patent: Jun. 6, 1835

(54) THEODOLITE

(76) Inventor: Samuel Stone

Samuel Stone. Long green, Maryland,

Letters Patent.

The Schedule referred to in these Letters Patent and making part of the same, containing a description in the words of the said Samuel Stone himself of his improvement in the art of measuring distances frome one station with a theodolite or any other instrument by which an angle can be made either perpendicularly or horizontally having a telescope attached to it.

To all to whom these presents shall come.

Be it known that I Samuel Stone of Long Green Baltimore County & State of Maryland, have invented a new and useful improvement in the art of measuring distances at one Station, with a theodolite or any other instrument by which an angle can be made either perpendicularly or horizontally, having a telescope attached to it, by making use of a flag staff, similar to a common leveling staff, graduated to suit the angle made by the instrument as will be more fully described hereafter and that the following is a full and exact description of the construction and operation of the said improvement as invented by me. The improved instrument is fixed on a tripod and stand of the usual kind The horizontal limb is extended in diameter beyond the usual [illegible] dimensions. The extension being for the purpose of forming a surface as well as centre on which a circular rim or plate revolves. The upper surface of this rim or plate, coincides with that of the limb & the limb & plate form a plane on which are delineated the logarithmic lines of numbers, sines & tangents. The said rim or plate is connected with the limb by means of a narrow rim which is screwed to the underpart of the rim overlapping the outer edge & allowing it to revolve freely. The plane is provided with a moveable index which shows the coincidence of the different lines with each other. All above the limb is the same as the modern Theodolite with the exception of two additional hairs hairs one above and the other below the horizontal hair & parallel with it. The whole horizontal limb of this instument is about [illegible] eleven inches diameter, having adjusting screws made in the common form- In this improvement the horizontal limb is extended about one inch and a half all round, beyond the usual dimension of the common theodolite [illegible] forming a plain with the limb of about two inches all round, on which is delineated the calculations which are as follows- on the upper surface of the limb & which forms a part of the above described plane are ex= hibited the logarithmic line of Numbers on a circle, & corresponds in all respects with the nature and use of a table of logarithms, on the upper sur= face of the rim or revolving plate before mentioned are also exhibited the same logarithmic line of Numbers divided and subdivided in pro= portional parts in all respects as on the limb, and as the nature of the line of Numbers requires. Next to this line of Numbers on this rim are [illegible] exhibited a logarithmic line of sines, extending to 90 degrees sub= divided into minutes, where the spaces will admit of such divi= sions- and so continued as to correspond with the line of numbers. Next to this on the same plate are exhibited the logarithmic line of tangents to forty five degrees, subdivided into minutes and corres= ponding with the line of sines and numbers by which any calcu= lation can be made that can be performed by the tables of logarithms and logarithmic tables of sines and tangents, Every Telescope used for surveying has two spiders webs or hairs crossing the centre of the focus glass at right angles, one perpendicularly and the other horizontally which are distinctly seen at the show glass- now in order to make an angle in the cylinder or tube of the telescope from the eye glass. let another hair be placed above the horizontal hair parallel with it, at a distance if possible to make an angle of one degree, or as large an angle as can be made in the field of observation it may be more or less than a degree as the con= struction of glass will admit. But in my present calculation I have [illegible] supposed the angle to be one degree- Secondly. A verticle angle may be made by elevating or depressing the telescope, and that angle being mea= sured by the graduated arch, or semicircle attached to the telescope And And thirdly, an angle may be made of the same magnitude, horizontally
by moving the end of the instrument – in either case when an angle
of one or more degrees is made and a levelling stave graduated to
correspond with the angle any distance can be measured without
a chain at one station, as far as the flag stave can be seen through
the Telescope, with more precision than can be measured by a chain.
The following embraces the principle of the graduated flag staff – It
is obvious that any angle opens from its centre in proportion to the
length of its base – If the angle be one degree, and the flagstaff stands
100 feet from the instrument, that angle will open on the stave 20.
94.24. inches but if the staff stands 500 feet or five chains from
the instrument then the same angle will open five times 20.94 &c
on the stave – therefore let the left hand side of the stave of any con-
venient length be divided into sections or parts of 20.94 inches each to
represent chains. and those parts subdivided into 100th parts to
represent feet or links, and those parts subdivided again by means
of a nonius in the target or sight to represent decimals of a link. the
right hand side of the target may be divided into feet, inches & decimals for
levelling in the common way – This stave is provided with two targets or
sights – the lower one being stationary at the distance of about four feet
from the bottom where the graduation on the left hand side of the staff
begins. The upper target may be moved up and down on the staff to cor-
respond with the angle in the telescope – These two principles, the angle
and the graduated staff are indispensible to each other – In the use of the
invention. The improved theodolite is set on the tripod, and levelled
in the usual way. Then place the staff on the line to be measured
at any visible and convenient distance from the instrument, direct
the telescope to the lower target which being stationary at the same
height as the instrument from the ground, and let the centre hori-
zontal hair, cut the centre of the target, then direct the eye to the
upper horizontal hair which forms the angle in the instrument,
and let the upper target be moved up or down, so that the upper
hair shall take the centre of the target. Then see what figure
the the upper target stands at which will show the distance the stave stands from the eye. suppose the target stands at the first large division on the stave marked 100. or 1 chain then the staff is one chain from the instrument and so of any other division, for the farther the target is from the eye the higher the upper target must be raised. If the angle in the Telescope be disregarded and you make use of the cross hairs only which are common to all leveling instruments and form a vertical angle by elevating the telescope. one degree; it will have the same effect, for instance let the cross hair strike the centre of the lower target as before; then elevate the telescope one degree and let the upper target be moved up or down, so that the hair shall strike it, which will point out the distance at which the staff stands from the instrument. By the same rule the angle may be made horizontally. and the staff turned down horizontally at right angles with the line, then sight through the telescope and let the hair cut the target in the centre as before. Then move the card of the instrument one degree, and let the target be moved till the hair strikes it in the centre, and the figure on which it stands will be the distance the staff stands from the instrument as before, for it is immaterial what way an angle is made; whether in the tube of the telescope, or a vertical or horizontal angle be made by the instrument, of one degree and applied to the staff, in either case it will have the same effect, but if this angle be made more or less than a degree the staff must be graduated to suit the angle, and applied as above directed, and it will have the same effect. The above described art of measuring distances without a chain is founded upon the principle of making an angle with any correct instrument by making the flag staff one side of the triangle. Although the length of the staff is not brought into con=sideration, yet it is known when an angle is made by a mathematical calculation, how far that angle will open in the distance of the chain or or 100 feet, then the perpendicular of that angle will be 30.94.34
inches. Now instead of making on the staff the length of the
perpendicular of that angle;— I mark the length of the base in that
same place viz 100 feet for when this angle opens 31.9434 inches on
the staff, the base must be 100 feet. but if the angle open on the
staff 41.88.48 inches, instead of marking 41 &c I mark 200 feet or
2 Chains, which must be the base or distance the staff stands from the
instrument, and in like proportion for any other angle. By this method
we discover that the perpendicular of the triangle or length of the staff
is not brought into particular consideration, although it is Mathe
matically measured, and the staff is in reality one side of the triangle
by which the base is determined— This invention also calculates
the latitude & departure of every course measured, and if the line
be not horizontal it calculates the base, and perpendicular of the
line, and the surface becomes the hypothenuse of the triangle which
is also calculated— It solves any question in Multiplication, Division
Rule of three, Interest, Mensuration, Gauging, Plane Trigonometry, or any
question that can be solved or performed by a table of logarithms, the
tables of logarithmic sines, and tangents. Any question in plain or
Trigonometry as well as other questions of Common arithemetic if
one statement can be solved in one minute with precision— In short
this invention comprehends all the principal tables in Gibbons
Surveying which fill nearly half his volume— The first improve=
ment which I claim is the mechanical additions to the common
theodolite, by extending the diameter of the horizontal limb, for
the purpose of forming a surface as well as a centre, on which a
circular rim or plate revolves as already described; and also
the application of the Logarithmic calculations as applied to the
circle as already described— But I particularly claim the improve
-ment of measuring distances by an angle at one point or station,
using the pole or stave with its graduations for one side of the
triangle.

Henry [illegible]
[illegible]

Samuel Stoner —

Exd [illegible]